US011257354B2

(12) United States Patent
Daly et al.

(10) Patent No.: US 11,257,354 B2
(45) Date of Patent: Feb. 22, 2022

(54) SMOKE DETECTION LAYOUT VALIDATION

(71) Applicant: Kidde Technologies, Inc., Wilson, NC (US)

(72) Inventors: Amanda J. Daly, Cary, NC (US); Kenneth Bell, Epsom (GB); Terry Simpson, Wake Forest, NC (US); May L. Corn, Manchester, CT (US); Vaidyanathan Sankaran, Ellington, CT (US); Changmin Cao, Shanghai (CN); Kalyana Gottiparthi, Ellington, CT (US); Ke Wang, Shanghai (CN)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 269 days.

(21) Appl. No.: 16/518,531

(22) Filed: Jul. 22, 2019

(65) Prior Publication Data
US 2021/0027612 A1    Jan. 28, 2021

(51) Int. Cl.
*G08B 29/04*    (2006.01)
*G06F 30/13*    (2020.01)
*G06N 7/00*    (2006.01)
*G08B 17/10*    (2006.01)
*G06F 111/10*    (2020.01)

(52) U.S. Cl.
CPC .......... *G08B 29/043* (2013.01); *G06F 30/13* (2020.01); *G06N 7/005* (2013.01); *G08B 17/10* (2013.01); *G06F 2111/10* (2020.01)

(58) Field of Classification Search
CPC .... G08B 29/043; G08B 17/10; G08B 29/185; G06F 30/00; G06F 30/13; G06F 2111/10; G06F 2113/08; G06F 30/28; G06N 7/005

USPC .............................................. 703/2
See application file for complete search history.

(56) References Cited

U.S. PATENT DOCUMENTS

| 2008/0106437 A1* | 5/2008 | Zhang ................ G08B 31/00 340/945 |
| 2015/0199891 A1* | 7/2015 | Zhang ................ G08B 17/10 340/521 |
| 2017/0128758 A1 | 5/2017 | Haaland et al. |

OTHER PUBLICATIONS

Shi, Zhigang et al., "The CFD Simulation and Experimental Analysis of Smoke Diffusion in a Train", 2011, International Conference on Computer Distributed Control and Intelligent Environmental Monitoring, IEEE. (Year: 2011).*
(Continued)

*Primary Examiner* — Cedric Johnson
(74) *Attorney, Agent, or Firm* — Cantor Colburn LLP

(57) ABSTRACT

Provided are embodiments for a system for validating a smoke detection layout, where the system includes a memory and a processor. The processor is configured to receive one or more inputs, model transport and dispersion of smoke to a smoke detector of an environment based on the one or more inputs, wherein the model is based on computational fluid dynamics (CFD) function, and select a subset of input parameters from the one or more inputs to test. The processor is also configured to test the smoke detection system layout using the selected subset of input parameters, determine an alarm time probability using uncertainty quantifications for the selected subset of input parameters, and provide the alarm time probability and confidence level for the selected subset parameters. Also provided are embodiments for a method to validate a smoke detection system layout.

18 Claims, 5 Drawing Sheets

(56) References Cited

OTHER PUBLICATIONS

Joglar, Francisco et al., "A Probabilistic Model for Fire Detection with Applications", 2005, Fire Technology, 41, Springer Science and Business Media, Inc. (Year: 2005).*
Kuffner, William et al., "Method of Determining Smoke Detector Spacing in High Ceiling Applications", Jan. 19, 2010, Fire Technology 50, Springer Science and Business Media, LLC. (Year: 2010).*
Chu et al, "Uncertainty Analysis 1-15 on Number of Fatalities in Building Fires," Industrial Engineering and Engineering Management, IEEE, Dec. 6, 2011, pp. 1902-1906.
European Search Report; European Application No. 19212845.2; Application Filed: Dec. 2, 2019; Report dated Jul. 3, 2020, 13 pages.
Jia, "Efficient Computing Budget Allocation for Simulation-Based Optimization With Stochastic Simulation Time," IEEE Transactions on Automatic Control, vol. 58, No. 2, Feb. 2013, pp. 539-544.
Joglar et al., "A Probabilistic Model for Fire Detection with Application," Fire Technology, vol. 41, No. 3, Jul. 1, 2005, pp. 151-172.
McGrattan et al., "NIST Special Publication 1019-5 Fire Dynamics Simulator (Version 5) User's Guide," National Institute of Standards and Technology, Oct. 1, 2007, 206 pages.

* cited by examiner

SMOKE DETECTION LAYOUT VALIDATION

BACKGROUND

The present invention generally relates to smoke detection systems, and more specifically to techniques for validating a smoke detection system layout.

Smoke detection systems are used in a wide range of spaces to provide protection against smoke and fire damage for a defined space. The spaces can include various structures including office buildings, warehouses, or residential homes. In addition, various vehicles such as aircraft, cruise ships, buses, etc. can include smoke detection systems. The types, number, and placement of the smoke detectors and sensors can change based on its application. For some applications, after the smoke detection system is designed the design must be certified prior to using the system in the field.

BRIEF DESCRIPTION

According to an embodiment, a method to validate a smoke detection system layout is provided. The method includes receiving one or more inputs; modeling transport and dispersion of smoke to a smoke detector of an environment based on the one or more inputs, wherein the model is based on computational fluid dynamics (CFD) function; and selecting a subset of input parameters from the one or more inputs to test. The method also includes testing the smoke detection system layout using the selected subset of input parameters; determining an alarm time probability using uncertainty quantifications for the selected subset of input parameters; and providing the alarm time probability and confidence level for the selected subset parameters.

In addition to one or more of the features described herein, or as an alternative, further embodiments include updating the subset of input parameters; re-testing the smoke detection system layout using the selected subset of input parameters; determining an alarm time probability using uncertainty quantifications for the updated subset of input parameters; and providing the alarm time probability and confidence level for the updated subset parameters.

In addition to one or more of the features described herein, or as an alternative, further embodiments include displaying a visual output of results of the test.

In addition to one or more of the features described herein, or as an alternative, further embodiments include a CFD function that is configured to computes the model based on at least one of time, position, and flow of smoke that can be detected by a smoke detector.

In addition to one or more of the features described herein, or as an alternative, further embodiments include an environment such as a cargo bay, electronics bay, avionics cooling space, or lavatory.

In addition to one or more of the features described herein, or as an alternative, further embodiments include a CFD function that computes the model based on a smoke detector type and the detection system layout.

In addition to one or more of the features described herein, or as an alternative, further embodiments include a CFD function that computes the model based at least in part on a geometry and contents of the protected environment.

In addition to one or more of the features described herein, or as an alternative, further embodiments include a CFD function that computes the model based at least in part on an ambient temperature, pressure, or ventilation schedule of the environment.

In addition to one or more of the features described herein, or as an alternative, further embodiments include a CFD function that computes the model based on a smoke output and location of a smoke source.

In addition to one or more of the features described herein, or as an alternative, further embodiments include a smoke output includes at least one of a concentration, velocity, temperature, or particle size distribution of the smoke.

According to another embodiment, a system for validating a smoke detection system layout is provided. The system includes a memory and a processor. The processor is configured to receive one or more inputs; model transport and dispersion of smoke to a smoke detector of an environment based on the one or more inputs, wherein the model is based on computational fluid dynamics (CFD) function; and select a subset of input parameters from the one or more inputs to test. The processor is also configured to test the smoke detection system layout using the selected subset of input parameters; determine an alarm time probability using uncertainty quantifications for the selected subset of input parameters; and provide the alarm time probability and confidence level for the selected subset parameters.

In addition to one or more of the features described herein, or as an alternative, further embodiments include the processor being configured to update the subset of input parameters; re-test the smoke detection system layout using the selected subset of input parameters; determine an alarm time probability using uncertainty quantifications for the updated subset of input parameters; and provide the alarm time probability and confidence level for the updated subset parameters.

In addition to one or more of the features described herein, or as an alternative, further embodiments include a display to display a visual output of results of the test.

In addition to one or more of the features described herein, or as an alternative, further embodiments include a CFD function that is configured to computes the model based on at least one of time, position, and flow of smoke that can be detected by a smoke detector.

In addition to one or more of the features described herein, or as an alternative, further embodiments include an environment that includes at least one of a cargo bay, electronics bay, avionics cooling space, or lavatory.

In addition to one or more of the features described herein, or as an alternative, further embodiments include a CFD function that computes the model based on a smoke detector type and the detection system layout.

In addition to one or more of the features described herein, or as an alternative, further embodiments include a CFD function that computes the model based at least in part on a geometry and contents of the protected environment.

In addition to one or more of the features described herein, or as an alternative, further embodiments include a CFD function that computes the model based at least in part on an ambient temperature, pressure, or ventilation schedule of the environment.

In addition to one or more of the features described herein, or as an alternative, further embodiments include a CFD function that computes the model based on a smoke output and location of a smoke source.

In addition to one or more of the features described herein, or as an alternative, further embodiments include a smoke output that includes at least one of a concentration, velocity, temperature, or particle size distribution of the smoke.

Technical effects of embodiments of the present disclosure include a design tool that can be used to validate a smoke detection system layout to increase the likelihood that certification of the system is achieved.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Fire detection systems layouts, including the detectors, sensors, and controllers, are required to be certified prior to installation for use. Oftentimes the smoke detection system layouts are designed based on experience from previous layout designs for similar aircraft families. The robustness of the smoke detection layout against certification standards is typically assessed via hundreds of tests in a ground test simulator. Final certification tests with the installed system are conducted in the aircraft at ground and altitude conditions. Current testing comes at a high cost. If the smoke detection system does not pass the test, the system must be reworked and retested until a suitable design is obtained, which could result in additional cost and schedule delays. An initial design of the smoke detection system indicating the number of smoke detectors and their locations are provided. During this development process, the number of detectors and their placement is varied to test the response time of the smoke detection system. For example, the system must be able to detect smoke within 1 minute's time. If the system fails, the installed detection system or layout in the aircraft will have to be adjusted or reconfigured which is a very expensive and complex task. In addition, any changes to the smoke detection system will require that the system be re-certified. In the event a satisfactory layout for the smoke detection system is determined, the layout can be subsequently optimized (tuning the number and locations of the smoke detectors) based on the results from the model.

The techniques described herein provide a tool that validates the smoke detection system using computational fluid dynamics (CFD). In addition, several input conditions and environmental parameters are varied and monitored to determine within a particular confidence level of how the smoke detection system will perform. CFD is a discipline within fluid dynamics that uses numerical analysis and data structures to model fluid flow. CFD can be used in a range of applications including but not limited to aerodynamics, combustion, weather simulation, multi-phase flows generally, etc. The types of fluid, fuel, boundaries, and other factors are input into the model to simulate a depiction of the fluid flow.

The techniques described herein include CFD modeling to simulate the smoke transport from fires or smoke generating machines. The techniques described herein incorporate CFD modeling into a design tool to assess the level of confidence that a given smoke detection layout will pass the certification tests.

Figure 1:
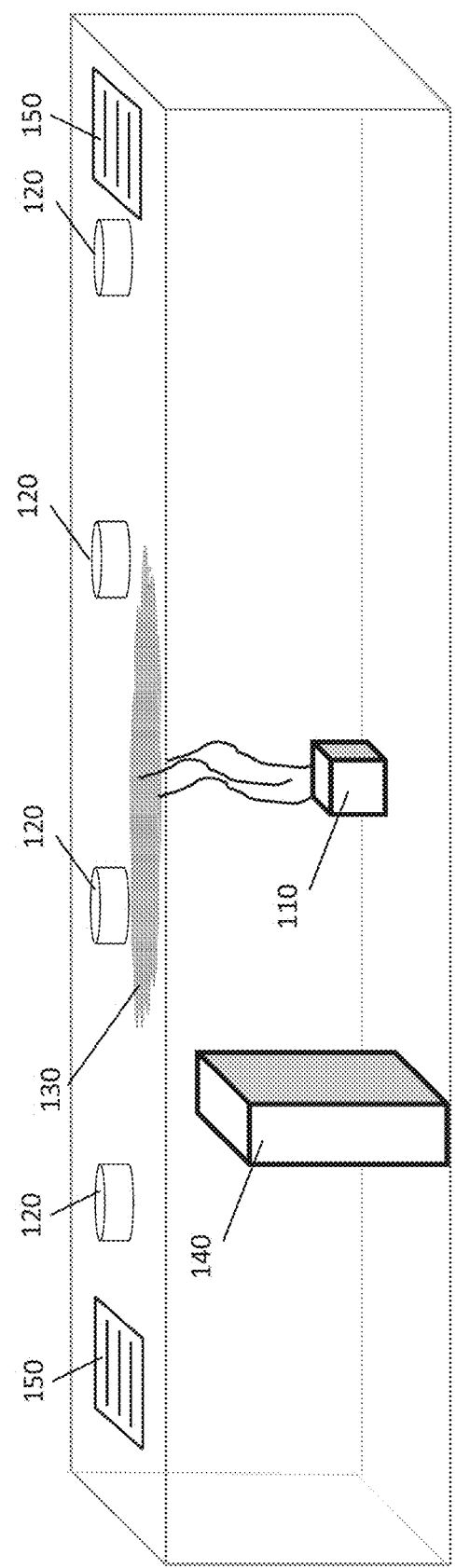
FIG. 1 depicts a smoke detection system layout in accordance with one or more embodiments.

FIG. 1 depicts a configuration during a simulation. The configuration and conditions can be varied during the simulation to obtain information with regard to the efficacy of the smoke detection system layout 100. Smoke detection system layout 100 can be incorporated in different structures such as office buildings and homes. In addition, the smoke detection system can be incorporated into various vehicles such as aircraft, buses, ships, etc. The layout for the smoke detection systems can vary based on the application and location. For example, a smoke detection system for compartments such as a cargo bay, electronics bay avionics cooling, lavatories, warehouses, etc. will have different geometries, air flows, contents that can directly impact the needs of the area.

The smoke detection system 100 is shown having a smoke source 110 and a plurality of smoke detectors 120. During the simulation, the position of the smoke detectors 120 and smoke source 110 are varied through a number of positions to test the time it takes for the smoke detectors 120 to trigger an alarm. During the simulation, the smoke source 110 generates smoke 130 that covers a range. In addition, the simulation can include obstacles 140 such as a wall, curtain, other boundary, etc. that can block or alter the path of the smoke from the smoke source 110 and possibly prevent a smoke detector detecting the smoke 130. During the simulation, the airflow throughout the environment can also be modeled which directly impacts the path of the smoke to the smoke detectors. In a non-limiting example, the simulation can account for the airflow impacted by inlet/outlet vents 150 of the system 100.

In the example shown in FIG. 1, the smoke from the smoke source 110 is modeled as propagated in an upward direction and the second smoke detector 120 from the left will detect the smoke before the third smoke detector 120. The smoke is likely blocked from the first smoke detector 120 and has not reached the fourth smoke detector 120 at this point in the simulation. If the alarm time for a successful test is configured to a maximum of one minute, at least two of the smoke detectors 120 must detect the smoke.

Figure 2:
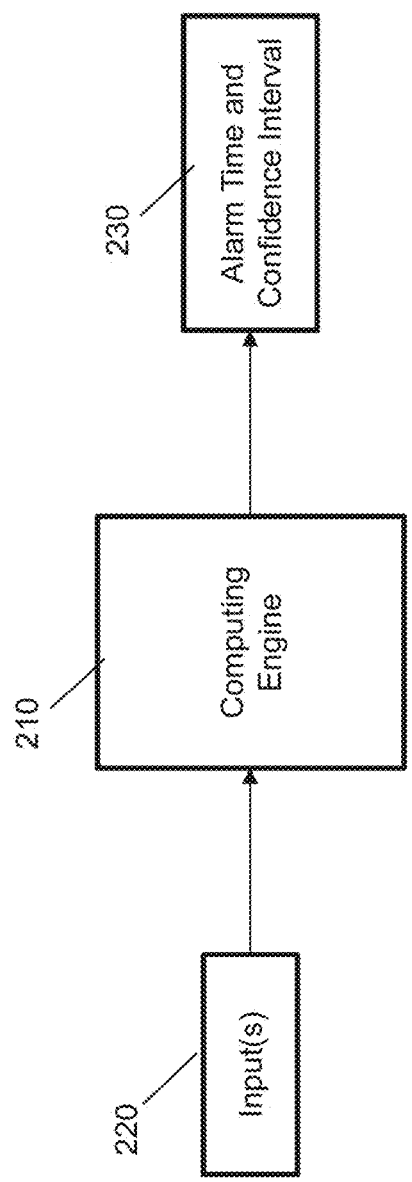
FIG. 2 depicts a system for validating a smoke detection system layout in accordance with one or more embodiments.

Now referring to FIG. 2, a system 200 for performing the validation of the smoke detection system layouts is shown. The computing engine 210 is configured to receive a variety of inputs 220. The inputs can include but are not limited to the geometry of the protected space, the location of the smoke source and smoke detector, the airflow in the protected space, obstacles in the protected space, and more. In addition, the type of smoke source can also be modeled by CFD. The type of smoke detectors can also impact the results of the validation process.

The computing engine 210 is configured to vary the location of the smoke source and the smoke detector during the simulation to obtain the results. In addition, the airflow and obstacles can also be included in the simulation to correctly model the path of the smoke. Brute force testing by an operator can quickly become unreasonable as the number of combinations of conditions is varied during each simulation. The techniques that are described herein provide a solution that computes a confidence level that a particular layout will pass the certification test.

The computing engine 210 processes the input conditions and outputs an alarm time and confidence interval for a particular design layout by using uncertainty quantification to define the alarm time probability and the next set of input conditions. The next set of input conditions can be based on identifying the input conditions (parameters) that have more of an impact on the simulation than others. For example, the uncertainty quantification analysis may provide that parameters such as airflow rate may not be as important as smoke source/smoke detector location, or temperature may not be as important as another input condition. After identifying the critical set of conditions, the layout can be retested to determine its confidence level in detecting a smoke condition within the specified alarm time.

A computing engine 210 is configured to receive various input conditions that can affect the behavior of the smoke and the behavior of the detector. The input conditions can include: (1) a smoke output and location; the smoke output includes data including smoke type, concentration, velocity, temperature, particle size distribution, etc.; (2) the ambient temperature, pressure, humidity, and ventilation schedule; (3) the geometry and contents of the protected space; (4) the smoke detector type and the detection system layout. The input conditions can be input into the computing system by a user.

Using the inputs, the computing engine 210 computes the transport and dispersion of smoke from the smoke source to the smoke detector. The computation is performed based on the CFD model, where the CFD model is validated with data sets that anchor the model to the configuration.

The computing engine 210 finally computes the detection system alarm time with a confidence interval 230. In one or more embodiments, the system alarm time and confidence interval 230 is provided. For example, for a given layout such as that shown in FIG. 1, a confidence interval can provide a 95% confidence that it will pass a certification test.

In one or more embodiments, a processing unit can be used to generate an animation of the simulation illustrating how the smoke is propagating from the fire or smoke source to the smoke detectors to provide a visual representation to an operator. The alarm time can be tracked on the animation. In addition, the confidence interval for the current configuration of a smoke source and smoke detector can be displayed to the user. It should be understood that other types of information can be displayed and is not limited to that described.

Figure 3:
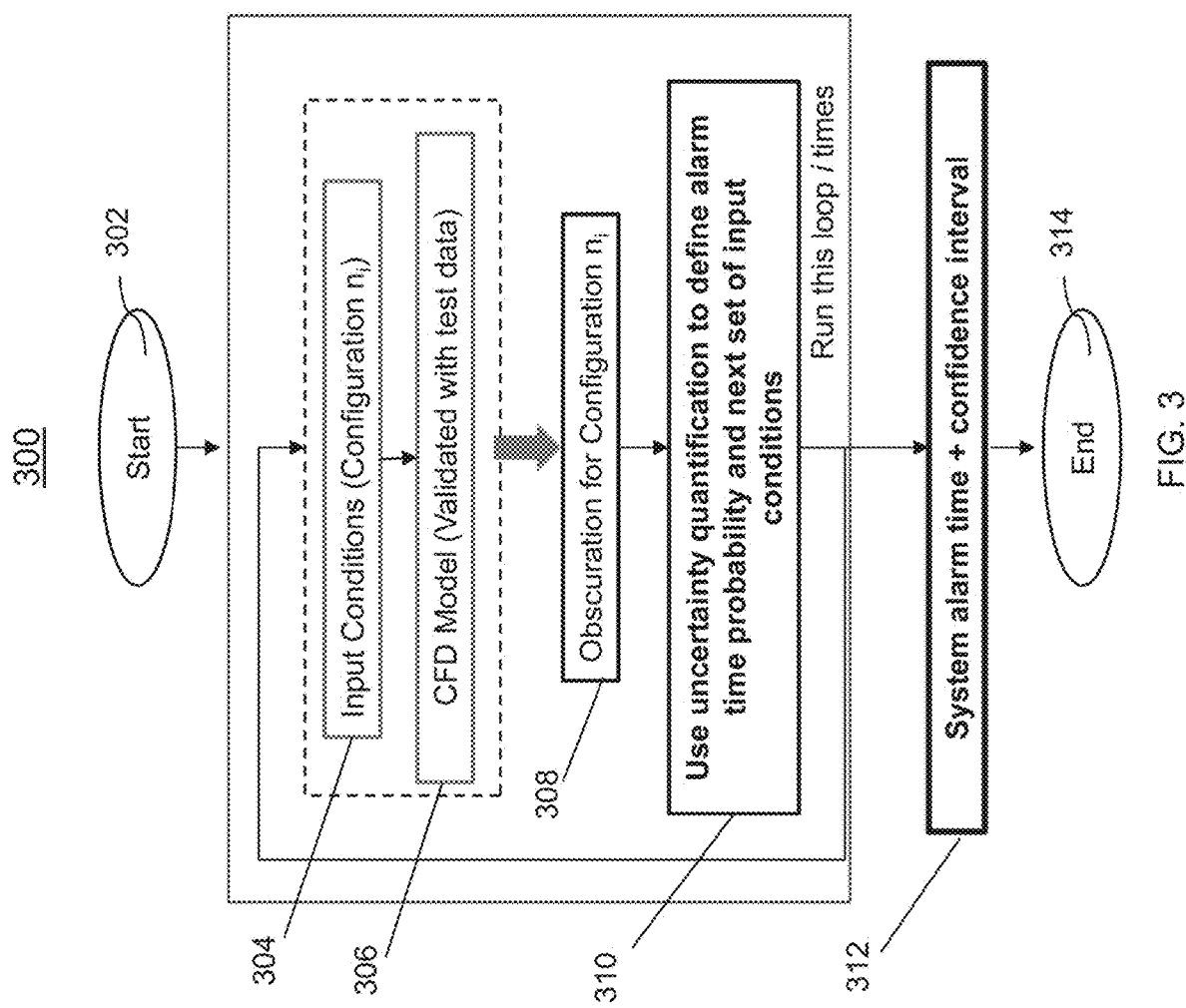
FIG. 3 depicts a flowchart of a method for validating a smoke detection system layout in accordance with one or more embodiments.

FIG. 3 depicts a flowchart of a method 300 for validating a smoke detection system layout in accordance with one or more embodiments. The method 300 begins at block 302 and continues to block 304 where input conditions for a configuration $n_i$ are received. The input conditions can include the smoke output and location, where the smoke output can include data characteristic of the concentration, velocity, temperature, particle size distribution, etc. of the smoke. In addition, the input conditions can also include environmental information such as the ambient temperature, pressure, humidity, and ventilation schedule. The geometry and contents of the environment including cargo, walls, mesh curtains, and other obstructions, and the smoke detector type and the detection system layout can all be input into the computing engine 210 for analysis. The obstructions are related to objects placed within the space to model effects on the flow within the space. The computation engine 210 is configured to compute the propagation and dispersion of smoke to the smoke detector using a computational fluid dynamics (CFD) model. At block 306, the CFD model is validated with test data.

At block 308, the computation engine 210 is configured to provide various obscurations in the simulation to test the robustness of the system to detect the smoke within the configured alarm time. At block 310, the computation engine 210 uses uncertainty quantification to assess the system's alarm time probability based on the obscurations calculated at block 308 and define the next set of input conditions. Subsequently, the system iterates through block 304-310 to further analyze the various sets of input conditions. The computation engine 210 computes the detection system alarm time with the confidence interval at block 312. The method 300 ends at block 314.

Figure 4:
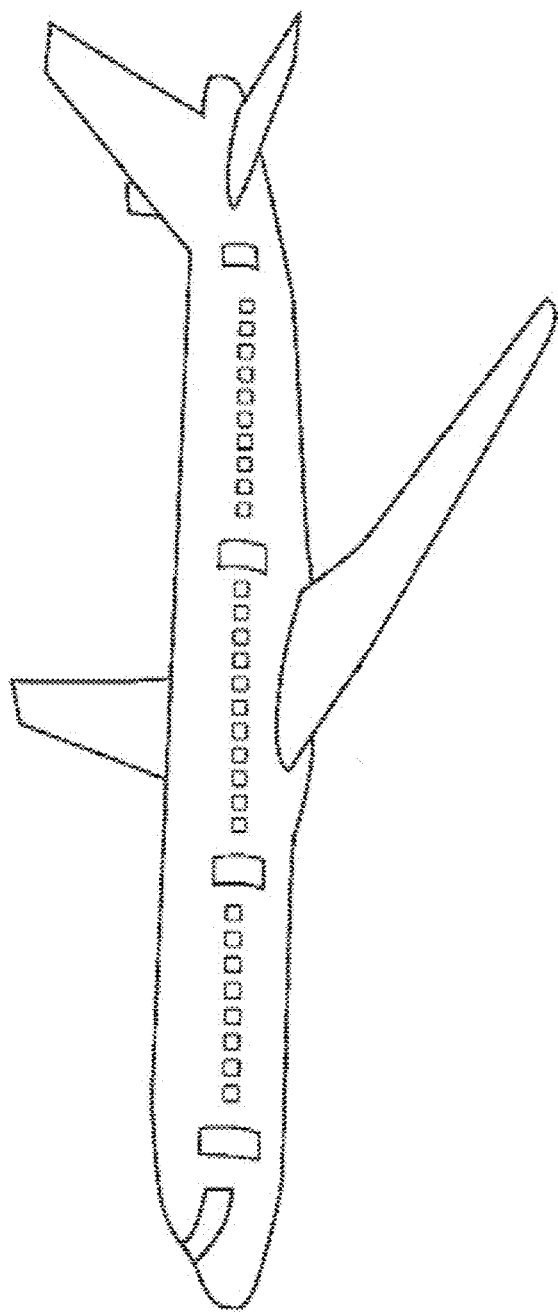
FIG. 4 depicts an aircraft that can implement a smoke detection system layout.

FIG. 4 depicts an aircraft 400 that can implement a smoke detection system layout in accordance with one or more embodiments.

Figure 5:
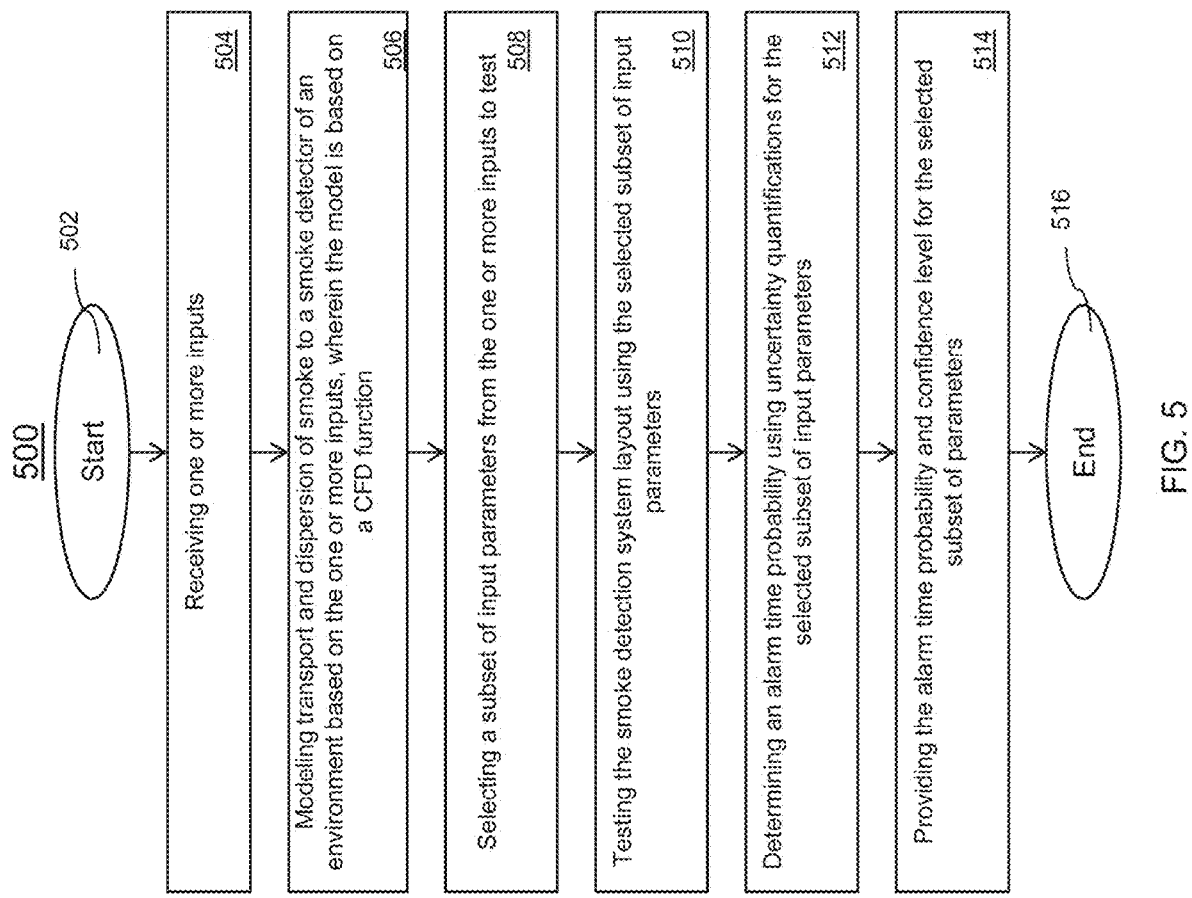
FIG. 5 depicts a flowchart of a method for validating a smoke detection system layout in accordance with one or more embodiments.

With reference to FIG. 5, a flowchart of a method 500 for validating a smoke detection system layout in accordance with one or more embodiments is shown. The method 500 can be implemented in a system 200 such as that shown in reference to FIG. 2. The method 500 begins at block 502 and proceeds to block 504 which provides for receiving one or more inputs. Block 506 models transport and dispersion of smoke to a smoke detector of an environment based on the one or more inputs, wherein the model is based on computational fluid dynamics (CFD) function. Next, the method 500 proceeds to block 508 and selects a subset of input parameters from the one or more inputs to test. At block 510, the method 500 tests the smoke detection system layout using the selected subset of input parameters. Block 512 determines an alarm time probability using uncertainty quantifications for the selected subset of input parameters, and at block 514, the method 500 provides the alarm time probability and confidence level for the selected subset parameters. The method 500 ends at block 516. It should be understood the steps provided in FIG. 5 are not intended to limit the scope but provide a non-limiting example to validate a smoke detection layout.

The technical effects and benefits include assessing the likelihood that the system layout in the aircraft can pass the certification tests at ground and altitude conditions during the development phase. The technical effects and benefits also include providing physical insight during the test campaign to understand test results and guide adjustments. In addition, the technical effects and benefits assess other scenarios to address potential problematic scenarios to ensure system robustness. The technical effects and benefits reduce the number of tests which results in a reduction in costs and an acceleration of the deployment of the smoke detection system. The technical effects and benefits provide the ability to obtain data in support of a system layout for use in support of certification of the aircraft.

A detailed description of one or more embodiments of the disclosed apparatus and method are presented herein by way of exemplification and not limitation with reference to the Figures.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method to validate a smoke detection system layout, the method comprising:
   receiving one or more inputs;
   modeling transport and dispersion of smoke to a smoke detector of an environment based on the one or more inputs, wherein the model is based on computational fluid dynamics (CFD) function;
   selecting a subset of input parameters from the one or more inputs to test;
   testing the smoke detection system layout using the selected subset of input parameters;
   determining an alarm time probability using uncertainty quantifications for the selected subset of input parameters;
   providing the alarm time probability and confidence level for the selected subset of input parameters;
   updating the selected subset of input parameters, wherein a number of input parameters of the updated subset of input parameters is less than a number of input parameters of the selected subset of input parameters;
   re-testing the smoke detection system layout using the updated subset of input parameters;
   determining an alarm time probability using uncertainty quantifications for the updated subset of input parameters; and
   providing the alarm time probability and confidence level for the updated subset of input parameters.

2. The method of claim 1, further comprising displaying a visual output of results of the test.

3. The method of claim 1, wherein the CFD function is configured to compute the model based on at least one of time, position, and flow of smoke that can be detected by a smoke detector.

4. The method of claim 1, further comprising optimizing the smoke detection layout, wherein the optimizing includes modifying a number of smoke detectors and locations of the smoke detectors for the smoke detection layout.

5. The method of claim 1, wherein the CFD function is configured to compute the model based on a smoke detector type and the detection system layout.

6. The method of claim 1, wherein the CFD function is configured to compute the model based at least in part on a geometry and contents of the protected environment.

7. The method of claim 1, wherein the CFD function is configured to compute the model based at least in part on an ambient temperature, pressure, or ventilation schedule of the environment.

8. The method of claim 1, wherein the CFD function is configured to compute the model based on a smoke output and location of a smoke source.

9. The method of claim 8, wherein the smoke output includes at least one of a concentration, velocity, temperature, or particle size distribution of the smoke.

10. A system comprising:
    a memory; and
    a processor coupled to the memory configured to:
       receive one or more inputs;
       model transport and dispersion of smoke to a smoke detector of an environment based on the one or more inputs, wherein the model is based on computational fluid dynamics (CFD) function;
       select a subset of input parameters from the one or more inputs to test;
       test the smoke detection system layout using the selected subset of input parameters;
       determine an alarm time probability using uncertainty quantifications for the selected subset of input parameters;
       provide the alarm time probability and confidence level for the selected subset of input parameters;
       update the selected subset of input parameters, wherein a number of input parameters of the updated subset of input parameters is less than a number of input parameters of the selected subset of input parameters;
       re-test the smoke detection system layout using the updated subset of input parameters;
       determine an alarm time probability using uncertainty quantifications for the updated subset of input parameters; and
       provide the alarm time probability and confidence level for the updated subset of input parameters.

11. The system of claim 10, further comprising a display to display a visual output of results of the test.

12. The system of claim 10, wherein the CFD function is configured to computes the model based on at least one of time, position, and flow of smoke that can be detected by a smoke detector.

13. The system of claim 10, wherein the environment comprises at least one of a cargo bay, electronics bay, avionics cooling space, lavatory, or storage space.

14. The system of claim 10, wherein the CFD function is configured to compute the model based on a smoke detector type and the detection system layout.

15. The system of claim 10, wherein the CFD function is configured to compute the model based at least in part on a geometry and contents of the protected environment.

16. The system of claim 10, wherein the CFD function is configured to compute the model based at least in part on an ambient temperature, pressure, or ventilation schedule of the environment.

17. The system of claim 10, wherein the CFD function is configured to compute the model based on a smoke output and location of a smoke source.

18. The system of claim 17, wherein the smoke output includes at least one of a concentration, velocity, temperature, or particle size distribution of the smoke.

* * * * *